United States Patent
Lange et al.

[11] Patent Number: 6,158,497
[45] Date of Patent: Dec. 12, 2000

[54] METHOD FOR PRODUCING A MODEL AND A METHOD FOR PRODUCING A MULTISECTION MOULD USING THE MODEL

[75] Inventors: Jørn Anker Lange, Aulum; Ejvind Viggo Kristensen, Skive, both of Denmark

[73] Assignee: Formkon ApS, Skive, Denmark

[21] Appl. No.: 09/077,126

[22] PCT Filed: Jun. 19, 1996

[86] PCT No.: PCT/DK96/00265

§ 371 Date: Jun. 2, 1998

§ 102(e) Date: Jun. 2, 1998

[87] PCT Pub. No.: WO97/19772

PCT Pub. Date: Jun. 5, 1997

[30] Foreign Application Priority Data

Nov. 28, 1995 [DK] Denmark .................. 1342/95

[51] Int. Cl.⁷ ............... B22C 7/00; B22C 9/00; B29C 67/00
[52] U.S. Cl. .............. 164/456; 164/4.1; 164/19; 164/45; 164/46; 264/227; 264/401
[58] Field of Search .................. 164/45, 34, 35, 164/19, 6, 46, 4.1, 456; 264/401, 227

[56] References Cited

U.S. PATENT DOCUMENTS

| | | |
|---|---|---|
| 3,190,946 | 6/1965 | Keyes . |
| 4,536,364 | 8/1985 | Lindskog . |
| 4,641,270 | 2/1987 | Lalloz et al. . |
| 5,439,622 | 8/1995 | Pennisi et al. ............ 264/401 |

FOREIGN PATENT DOCUMENTS

| | | |
|---|---|---|
| 0666127 | 8/1995 | European Pat. Off. . |
| 49-42772 | 11/1974 | Japan ............ 164/46 |
| 51-88425 | 8/1976 | Japan ............ 164/35 |
| 3-182313 | 8/1991 | Japan ............ 164/45 |
| 5-147044 | 6/1993 | Japan . |
| 2230981 | 11/1990 | United Kingdom . |
| WO91/15330 | 10/1991 | WIPO . |

*Primary Examiner*—J. Reed Batten, Jr.
*Attorney, Agent, or Firm*—Ladas & Parry

[57] ABSTRACT

The method comprises the production of a first positive model of an item to be cast. The positive model is produced with a flange extending in an imaginary separation line of the item. The flange extends both inwardly in the item within an outer periphery of the item and outwardly outside the outer periphery of the item. The flange establishes an artificial increase of the thickness of the item. Through different intermediate steps at least a first mould part and a second mould part of a mould are produced. The first and the second mould part of the mould initially have a separation zone forming a contact surface between the first and the second mould part. The mould parts are treated in the separation zone so that the negative moulds of an upper and a lower surface of the part of the flange extending outside the item will subsequently form a contact surface of the first and the second mould part. The advantage of the method is a fast and easy production of moulds for complicated item geometries and different joint surface conditions as well as moulds having considerably better mould tolerances than known moulds produced traditionally, e.g. by means of stereo lithography.

15 Claims, 11 Drawing Sheets

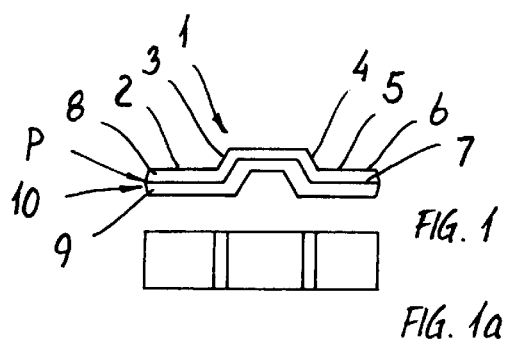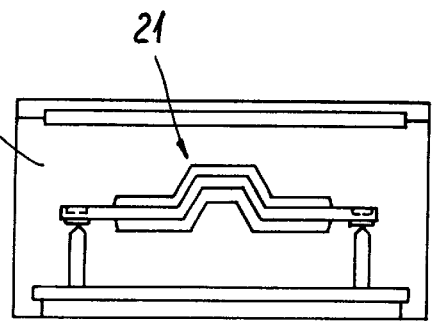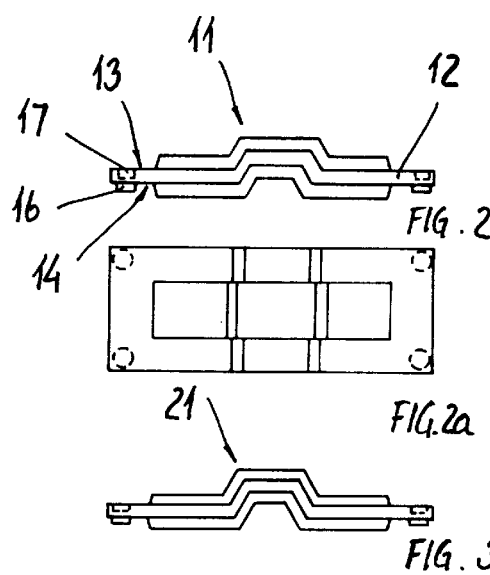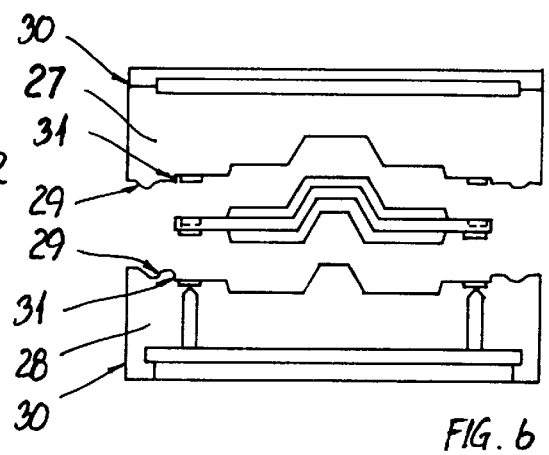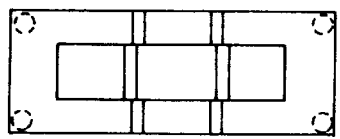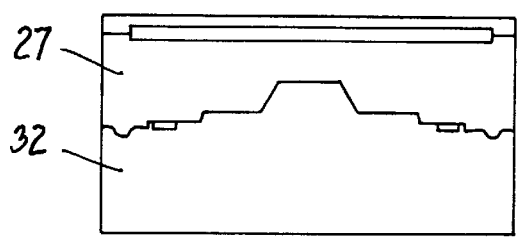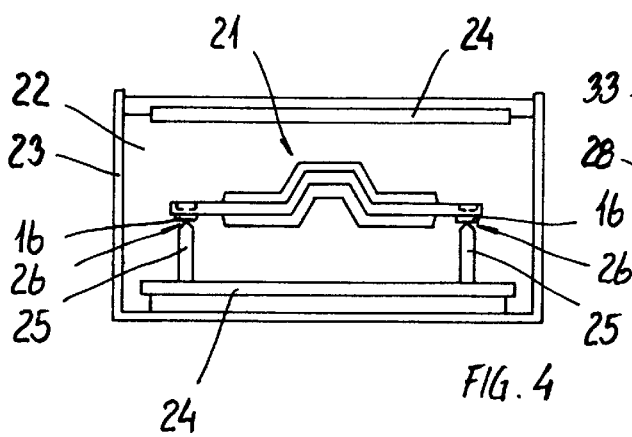

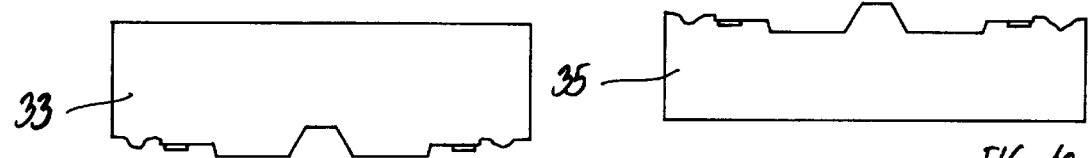
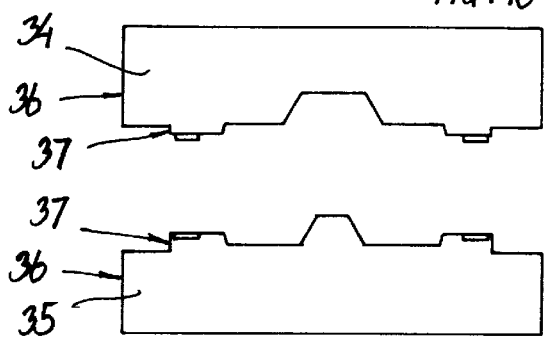
FIG. 10
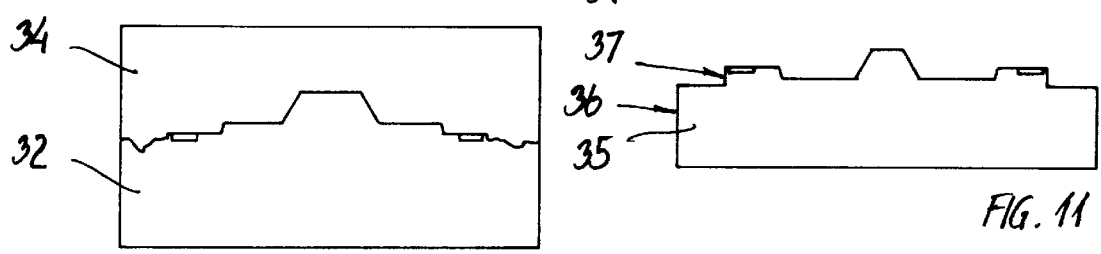
FIG. 8
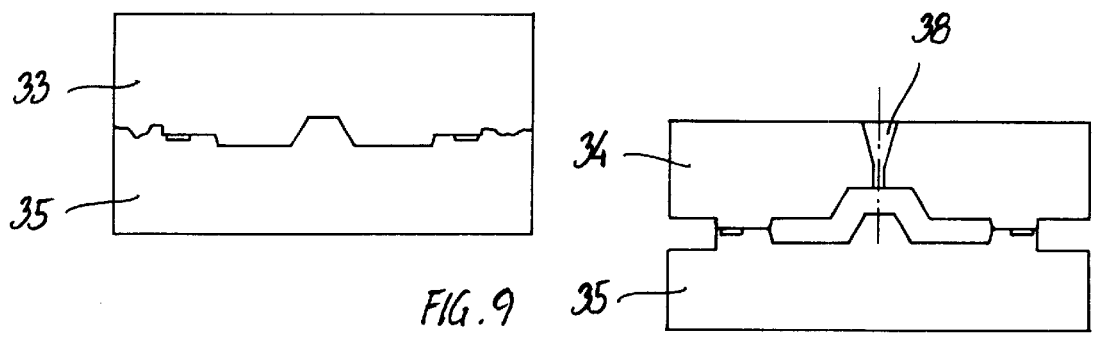
FIG. 11
FIG. 9
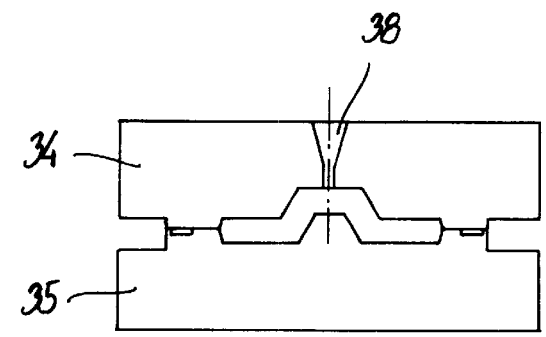
FIG. 12

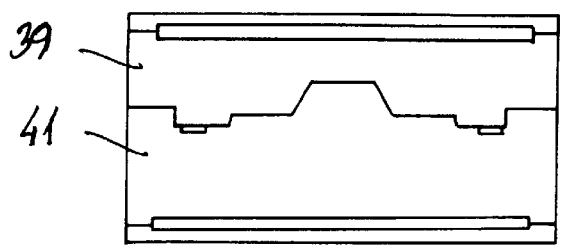
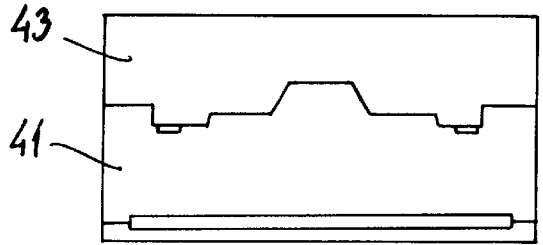
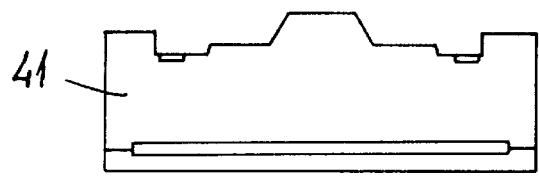
FIG. 20
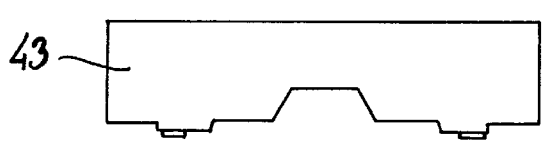
FIG. 22
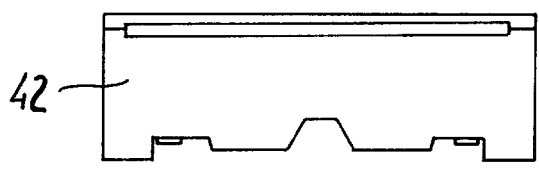
FIG. 21
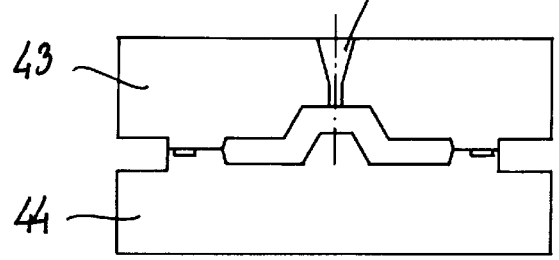
FIG. 23
FIG. 24

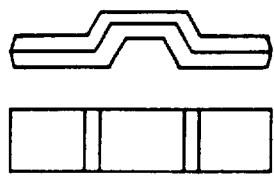
FIG. 25
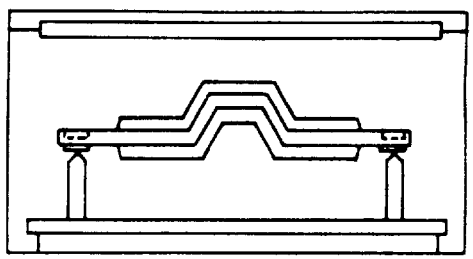
FIG. 29
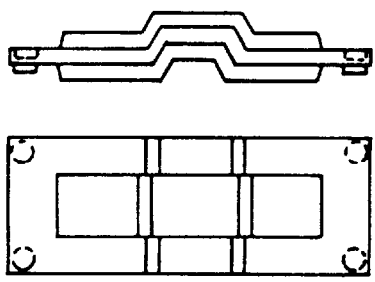
FIG. 26
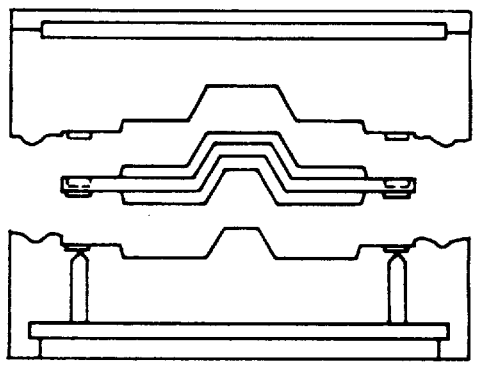
FIG. 30
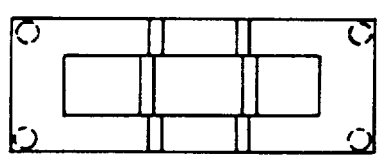
FIG. 27
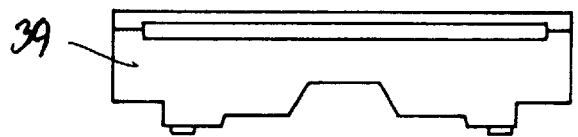
FIG. 31
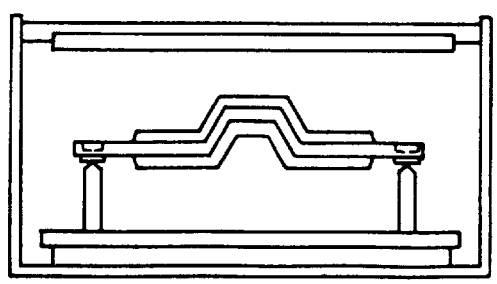
FIG. 28
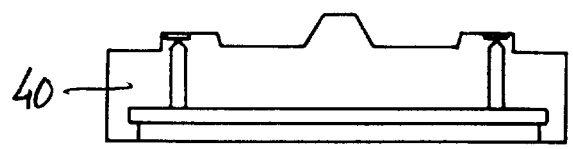

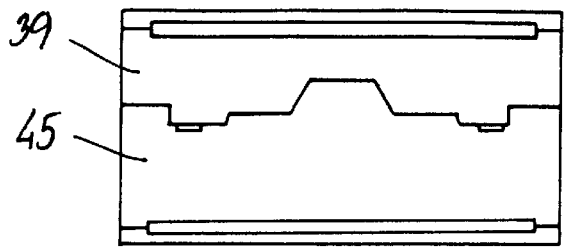
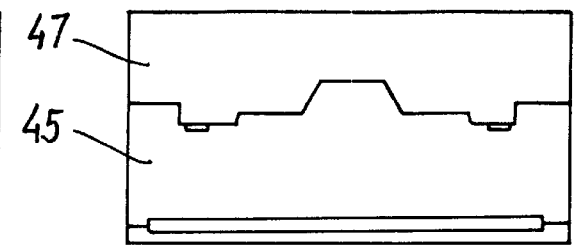
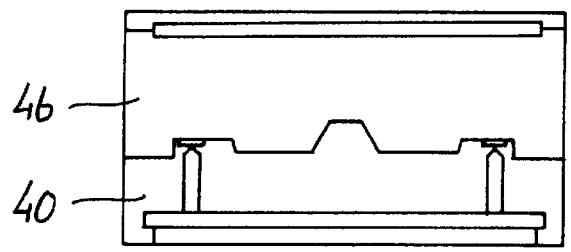
FIG. 32
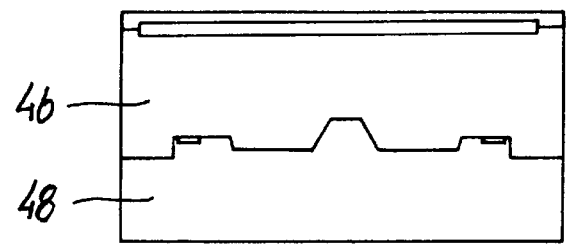
FIG. 34
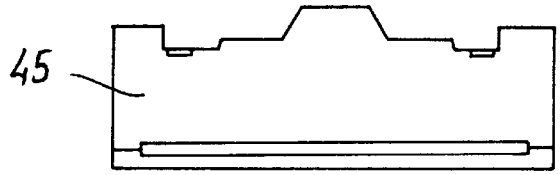
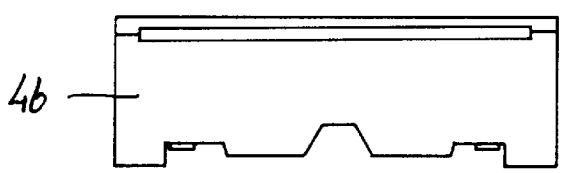
FIG. 33
FIG. 35
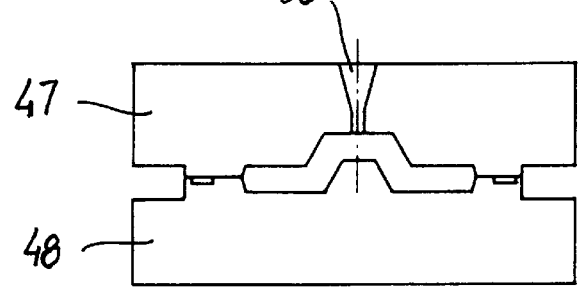
FIG. 36

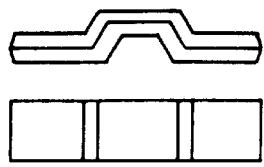
FIG. 37
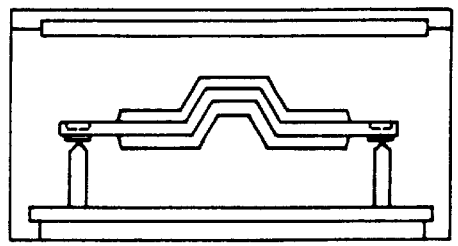
FIG. 41
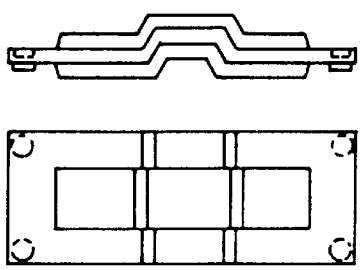
FIG. 38
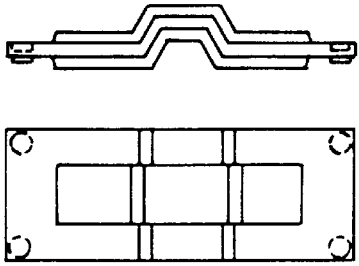
FIG. 39
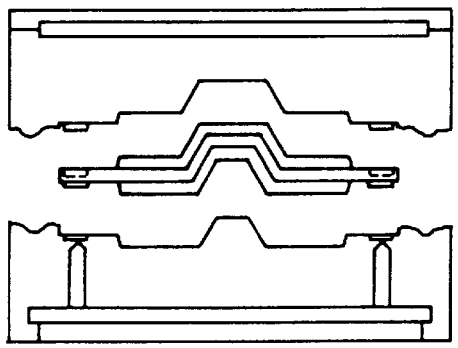
FIG. 42
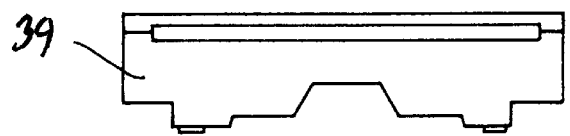
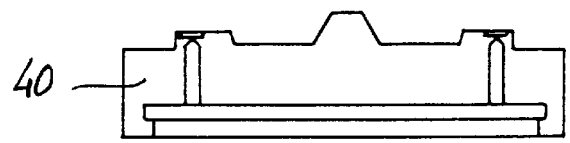
FIG. 43
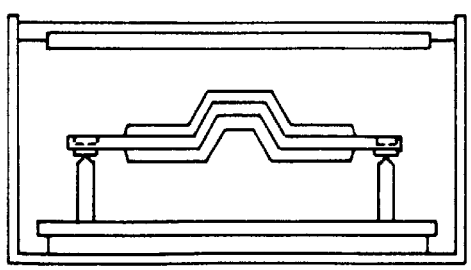
FIG. 40

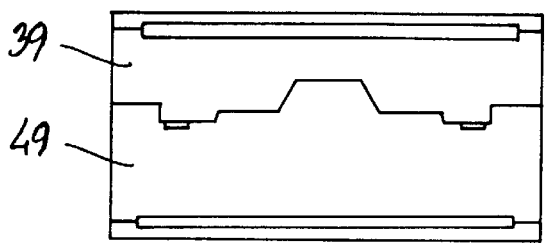
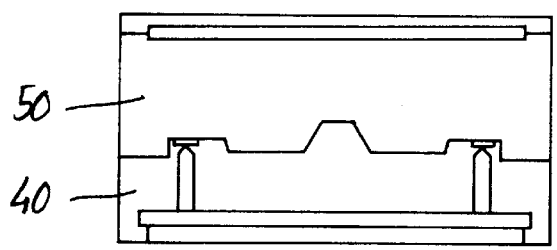
FIG. 44
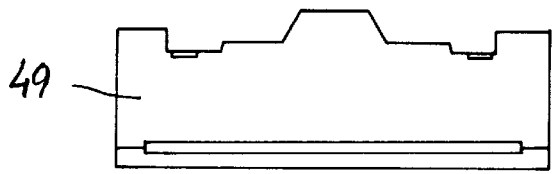
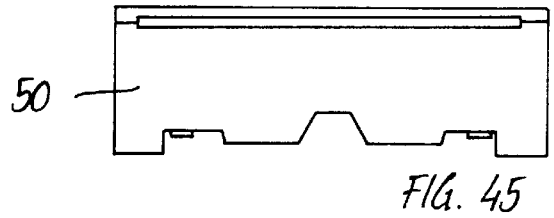
FIG. 45
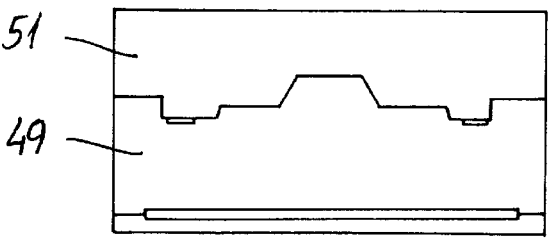
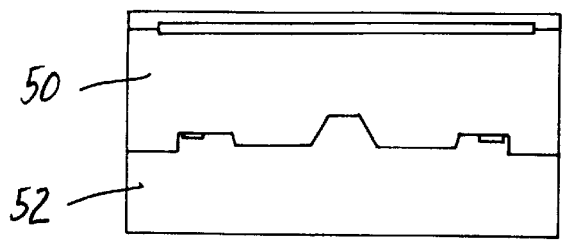
FIG. 46
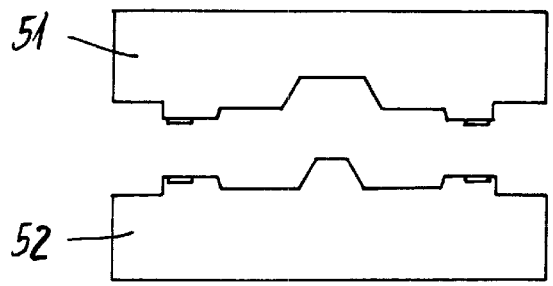
FIG. 47
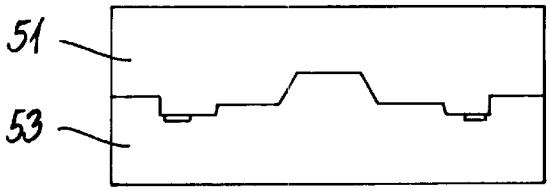
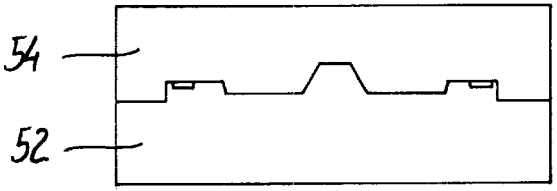
FIG. 48
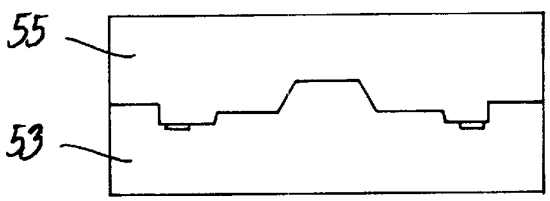
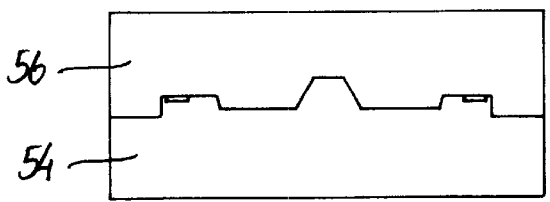
FIG. 49
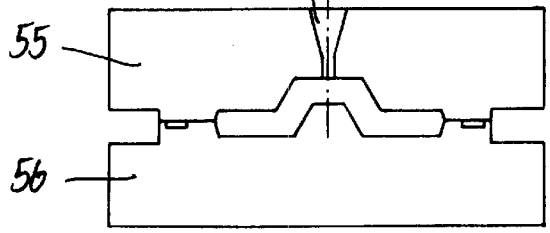
FIG. 50

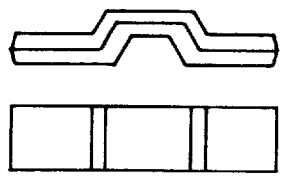
FIG. 51
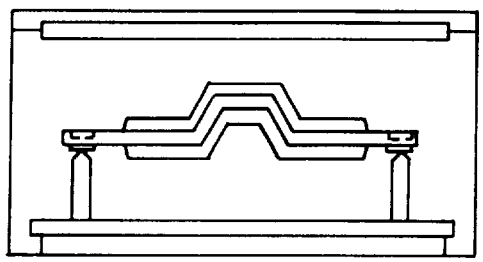
FIG. 55
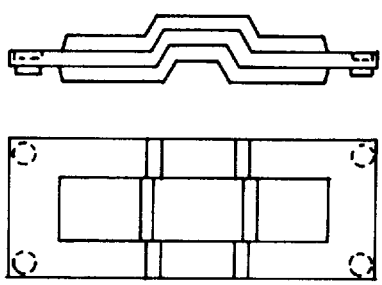
FIG. 52
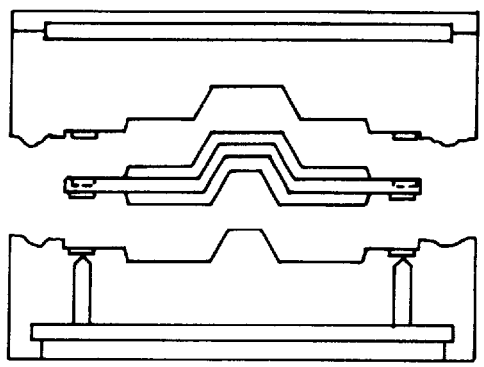
FIG. 56
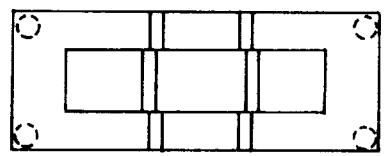
FIG. 53
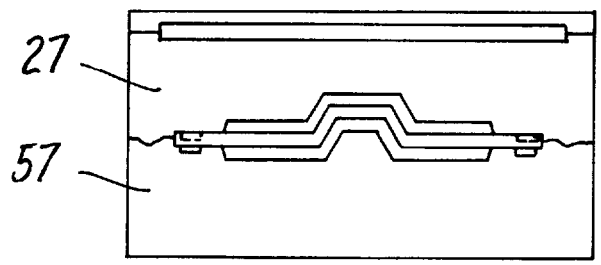
FIG. 57
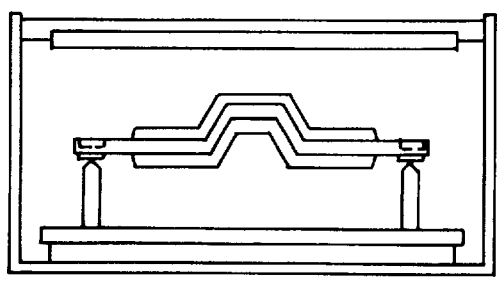
FIG. 54
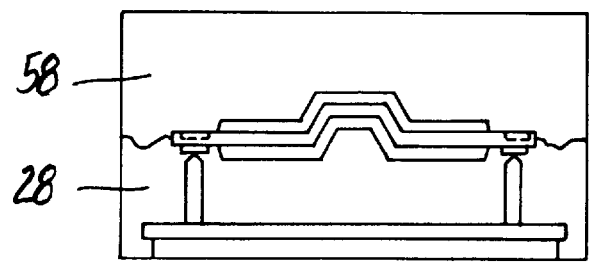

METHOD FOR PRODUCING A MODEL AND A METHOD FOR PRODUCING A MULTISECTION MOULD USING THE MODEL

INTRODUCTION

The present invention relates to a method of producing a model for use in the manufacture of a mould that consists of a multisection mould, said method comprising steps in which a first positive model of an item to be moulded in the moulding tool is formed by modelling the item and further by providing it with a flange, which is provided in a joint surface of the mould being formed with an outer circumference outside and along the outer periphery of the model, and that parts of the model are displaced after which a distance between the parts is formed by displacement of the parts.

The manufacture of moulds on the basis of a model of an item to be cast may be performed in different ways. One possible way suited for small items and for casting preliminary product series is the use of a stereo lithography model of the item. The stereo lithography model is produced in a plastic material by laser treatment. The stereo lithography model is then used as a basis for producing the mould.

It is known to use a stereo lithography model wherein a joint line to be established in the finished mould is established by providing the stereo lithography model, around an outer periphery of the model, with thin tape, which extends outwardly from the outer periphery and which will establish a joint surface in the silicone mould when casting a negative mould of silicone. The tape to be used has to be very thin and extends only in planes outside the item but is fastened to an area of the item along the outer periphery of the item.

This method may be used when the mould is manufactured from an elastic material such as rubber or silicone and when the mould has simple joint surface extensions. In cases when the mould has more difficult joint surface extensions in firm moulds, such as a mould manufactured from aluminium, this method is not applicable.

A different method of manufacturing moulds having difficult joint surface extensions consists of spreading on the basis of craftsmanship. This method also uses a model of the item to be cast and wherein a joint line to be established in the finished mould is established by providing the model, along a joint surface, with a plastic shaping mass such as putty, two-component filler or other material. The plastic shaping establishes a joint surface in the silicone mould when casting a negative mould of silicone.

U.S. Pat. No. 3,723,585 describes yet another method of manufacturing moulds on the basis of a model. The U.S. patent describes a mould with a parting frame at the location of the contemplated parting line of a two-part separable mould. The parting frame is constructed by first determining a parting line along the circumference of the mould and thereafter designating as the parting frame a rigid rectangular frame being a rectangular periphery about parallel faces of the parting frame. The parting frame furthermore has different thickness depending on the different parts of the parting frame serving different purposes, either as the actual periphery of the parting frame, or as the rigid rectangular frame between the two parts of the two part mould, or as protrusions for accurate location of various portions of the interior of the model in relation to the mould.

This method has the disadvantage that the dividing of the two part mould into two separable parts takes the basis in the mould and not in the item or the model itself. Thereby the mould may be made in such a way that the item can be moulded but perhaps not in the best manner depending on the item. This is especially disadvantageous if the item is very complicated with protrusions and indentations. However, as mentioned in the US patent, the method described is developed for and therefore primarily suitable for giant articles weighing more than two kilograms, such as a two passenger boat. The method is not suitable for small or tiny articles and especially not possible to use for complex articles. Furthermore, the method is for preparing a mould, not for preparing a model.

Thus, it is the object of the present invention to provide a method of producing a model that does not have the disadvantages discussed above and wherein it is consequently not necessary to use tape or a plastic shaping mass for the establishment of a joint surface in the mould and which take the basis in the item itself and not the mould.

This object is obtained by a method that is characterised in that in a computer environment a positive model with a built-in joint surface extending inside the model and out to the outer periphery of the model is constructed, that in the computer environment the item is separated into several parts along the joint surface, that the parts are displaced along a chosen direction, preferably a chosen unmoulding direction, that the flange is formed electronically in the computer environment, said flange being coherent and being extended in the distance between the parts along said joint surface and being formed with an outer circumference outside and along the outer periphery of the item, and that a physical model in space of the item with the flange is formed in a copy modelling process, preferably by stereo lithography.

The provision of a flange having these characteristics and wherein a flange of a certain thickness extends through the item means that in a joint surface of the multisection mould an artificially increased thickness of the item is established by incorporating artificial dimensions in the joint surface. This means that the positive model of the item has a thickness that is larger than the desired thickness of the finished item. The increase of the thickness corresponds to the thickness of the flange. The artificial increase of the thickness in the joint surface of the multisection mould is subsequently removed by milling or other treatment in a separation zone of the mould so that the artificial increase of the thickness is no longer present in the separation zone of the multisection mould.

In connection with prior art, in which face portions between parts of a mold have been based on the mold, and not been based on the item itself, that was to be molded, it was the face portions, which only could extend in one plane, that founded the basis for the choice of parting line at the item. Therefore, the item was shaped on the basis of this plane forming the face portions and the corresponding parting line.

Contrary hereto, by providing a computer environment suited therefor it is now possible to make a more qualified determination of a joint surface through a particular item, and not only determine the face portions through a mold. This means that it is actually not possible to determine face portions between parts of the subsequent mold until the joint surface through the item has been determined. Furthermore, the face portions can have very different extensions often different form plane face portions, and accordingly entirely dependant on the joint surface through the corresponding item.

It is a further object of the invention to provide a method of manufacturing a mould using the method of producing a model, which is less complicated and which leads to better measure tolerances in the mould and minimises the extent of manual work.

This object is obtained by a method that is characterised in that the flanged model is cast in a mass of material for the manufacture of a mould, that a mould is formed around the model, that the mould is cut along a separation zone extending from outer surfaces of the mould to an outer edge area of the flange, that the mould is separated into at least a first mould part and a second mould part, and that the separation zone is treated for removal of superfluous material corresponding to the dimension of the flange.

The manufacture of the multisection mould depends on the material in which the items are to be cast, e.g. plastic, aluminium, steel or other materials. In the production of plastic items, for example, it will be sufficient for small production sizes to manufacture a mould of aluminium. In the production of aluminium items, for example, it will be sufficient for small production sizes to manufacture a mould of plaster of Paris. In the production of steel items, for example, it will be suitable to manufacture the mould from moulding sand.

A preferred method of manufacturing a mould using the method of producing a model is characterised in that the flanged model is cast in a mass of flexible material, preferably silicone, wherein a first negative mould of the model is formed in a first intermediate step, that a second positive model is formed in a second intermediate step by casting in the first negative mould, and that a second negative mould of the model is formed in a third intermediate step by casting in the second positive model.

Cutting along a separation zone extending from outer surfaces of the mould to an outer edge area of the flange, separating the mould into a first mould part and a second mould part and treating the separation zone for removal of a contribution originating from the flange and contributing to an increase of the thickness of the joint surface ay be done on the first negative mould or the second negative mould. If the separation zone in the first negative mould is treated, it is not necessary subsequently to treat the separation zone in the second negative mould. If the separation zone in the first negative mould is not treated, however, it is necessary subsequently to treat the separation zone in the second negative mould.

The mould of the flexible material is preferably provided with mould stabiliser elements embedded in the mould. The mould stabiliser elements may be plates extending between the mould hollow and outer surfaces of the mould. The mould stabiliser elements may further be guiding elements or other longitudinal elements extending in different areas and in different directions between the mould hollow and outer surfaces of the mould. The mould stabiliser elements may also extend out to and through the outer surfaces of the mould.

A preferred method of manufacturing a mould, e.g. for casting plastic items, comprises steps wherein in the second intermediate step a first mould part and a second mould part of a second positive model in plaster of Paris are formed by plaster being moulded in the first silicone mould part and the second silicone mould part, that in the third intermediate step a first mould part and a second mould part of a second negative mould of metal are formed by metal being moulded in the first mould part and the second mould part of plaster of Paris, and that the first mould and the second mould part of metal are treated from outer surfaces to the joint surface for removal of a contribution originating from the flange for increasing a thickness of the joint surface.

A preferred method of manufacturing a moulding tool, e.g. for casting aluminium items, comprises steps wherein in a second intermediate step a first mould part and a second mould part of the second positive model of silicone are formed by silicone being cast in the first mould part of silicone and in the second mould part of silicone, that in a third intermediate step a first mould part and a second mould part of a second negative mould of plaster are formed by plaster being cast in the first mould part and the second mould part of silicone and that the first mould part and the second mould part of plaster are treated from outer surfaces to the joint surface for removal of a contribution originating from the flange.

Alternative methods of manufacturing moulding tools consist in spraying, sintering or otherwise establishing negative moulds around a model of the item to be cast.

DESCRIPTION OF THE DRAWING

The invention will now be described with reference to the accompanying drawing, wherein FIG. 1 is an outline of an item to be cast, seen from a first side, FIG. 1a is an outline of the item to be cast, seen from a second side perpendicular to the first side, FIG. 2 is an outline of the item seen from a first side with a flange extending within and outside an outer periphery of the item, FIG. 2a is an outline of the item with the flange seen from a second side perpendicular to the first side, FIG. 3 is an outline of a first positive model seen from a first side of an item to be cast, FIG. 3a is an outline of a first positive model seen from a second side perpendicular to the first side, FIG. 4 is an outline of the first positive model positioned in a moulding box, FIG. 5 is an outline of a silicone mould having the first positive model cast in, FIG. 6 is an outline of the silicone mould separated into a first mould part and a second mould part, FIG. 7 is an outline of plaster castings cast in the first and the second mould half of silicone, FIG. 8 is an outline of the plaster castings separated into a first mould part and second mould part, FIG. 9 is an outline of aluminium castings cast in the first and the second mould part of plaster, FIG. 10 is an outline of the aluminium castings separated into a first mould part and the second mould part, FIG. 11 is an outline of the first and the second mould part of aluminium with parts milled away around joint surfaces in the first and the second mould part, FIG. 12 is an outline of the first and the second mould part of aluminium joined into a mould having inlets for material for casting an item, FIGS. 13–24 are outlines of a second sequence of manufacturing a mould according to the invention, FIGS. 25–36 are outlines of a third sequence of manufacturing a mould according to the invention, FIGS. 37–50 are outlines of a fourth sequence of manufacturing a mould according to the invention, FIGS. 51–60 are outlines of a fifth sequence of manufacturing a mould according to the invention.

FIG. 1–FIG. 12 show a first sequence of manufacturing a metal mould by the method according to the invention. The mould is intended for casting items of plastic.

FIG. 1 and FIG. 1a show an item 1 of plastic intended to be cast in an aluminium mould. The item has surfaces 2, 3, 4, 5, 6 in different planes. An imaginary joint line 7 separates the item 1 into an upper half 8 and a lower half 9. The imaginary joint line 7 is determined on the basis of calculations of the casting of the item 1 from the shape and dimensions of the item. In the embodiment shown of the item 1, the imaginary joint line 7 has been determined as a joint line extending from a discontinuous point p at an outer periphery 10 of the item 1 and through the item 1 along and across the item 1.

FIG. 2 and FIG. 2a show an imaginary item 11 supplied with a flange 12. The flange 12 extends inwardly into the item 11 along the imaginary joint line 7 along and across the item 1. The flange 12 further extends outside the item from the point p from which the joint line 7 extends and outwardly from the outer periphery 10 of the item. The part of the flange 12 that extends outside the item, has an upper surface 13 and a lower surface 14 and is provided in corners 15 with grooves 16 and recesses 17 designed to contact guiding elements in the shape of level columns (see FIG. 4) in a mould part.

FIG. 3 and FIG. 3a show a first positive model 21 of the item with the flange 12 shown in FIG. 2 and FIG. 2a. The model 21 has been produced by means of a copy modelling process. The copy modelling process may be stereo lithography, wherein a copy of the item is produced by laser treatment of a plastic material. However, other copy modelling processes may also be used. The model 21 has shapes and dimensions identical to those of the item 11 with the flange 12. Production of the model 21 preferably takes place by means of Computer Aided Design (CAD), wherein the model is produced directly from a computer, e.g. by laser treatment of a liquid plastic material such as stereo lithography.

FIG. 4 shows a silicone mould 22 cast around the first positive model 21 of the item. The silicone mould 22 has been cast in a moulding box 23. Provided in the moulding box 23 and embedded in the silicone mould 22 are mould stabiliser elements such as plate elements 24 and column guides 25, which are mounted on the plate elements 24. The grooves 16 on the model 21 contact points 26 on the guiding elements 25. By means of the guiding elements 25 it is possible to perform a precise alignment of the model 21 in the mould 23. The alignment is done to position the model 21 in the mould 22 in respect of a chosen unmoulding direction of the model 21 in the mould 22.

FIG. 5 shows the silicone mould 22 after having been cast around the model 21 and after the moulding box 23 has been removed from around the silicone mould 22. The silicone mould 22 still contains the first positive model 21 of the item. When casting the silicone, a first negative mould of the model 21 is formed.

FIG. 6 shows a separation of the silicone mould into a first mould part 27 and a second mould part 28. The separation takes place at a separation zone 29 of the silicone mould 22. The separation zone 29 extends from outer surfaces 30 of the silicone mould to an outer edge area 31 of the negative mould of the flange 12 on the model 21. After cutting, the silicone mould 22 may be separated into the first mould part 27 and the second mould part 28, and the first positive model 21 may be removed from the silicone mould 22.

FIG. 7 shows the first mould part 27 and the second mould part 28 of silicone separated from each other. The first mould part 27 still contains the plate element 24 as a mould stabiliser element, and the second mould part still contains the plate element 24 and the guiding elements 25 as mould stabiliser elements. The first mould part 27 and the second mould part 28 of silicone are used for moulding a first mould part 32 and a second mould part 33 of plaster of Paris.

FIG. 8 shows the first mould part 32 and the second mould part 33 of plaster of Paris after having been removed from the first mould part 27 and the second mould part 28 of silicone. The first mould part 32 has a positive shape of one half of the model 21, and the second mould part 33 has a positive shape of the second half of the model 21.

FIG. 9 shows the first mould part 32 and the second mould part 33 of plaster of Paris separated from each other. The first mould part 32 and the second mould part 33 of plaster are used for moulding a first mould part 34 and a second mould part 35 of aluminium.

FIG. 10 shows the first mould part 34 and the second mould part 35 of aluminium after having been removed from the first mould part 32 and the second mould part 33 of plaster of Paris. The first mould part 34 has a negative shape of the first mould part of the model 21, and the second mould part 35 has a negative shape of the second half of the model 21.

FIG. 11 shows the first mould part 34 and the second mould part 35 of aluminium after a treatment has been performed on the separation zone 29 originating from cutting the silicone mould (see FIG. 6). The treatment is performed by milling off material. The milled-off area extends from outer surfaces 36 of the mould parts 34, 35 and inwardly towards an outer edge area 37 of the negative mould of the flange 12. This means that a contact surface between the first and the second mould part, which was previously constituted by the separation zone 29, is now constituted by the negative mould of the upper surface 13 and the lower surface 14 of the flange 12.

FIG. 12 shows the first mould part 34 and the second mould part 35 joined into a complete mould. In the first mould part 34 an inlet 38, e.g. for a plastic material to be cast in the mould, is provided. The contact surface between the first and the second mould part is constituted, as mentioned, by the upper surface 13 and the lower surface 14 of the part of the flange 12 that extends outside the item. This means that an item 1 to be cast in the moulding tool, does not possess the flange 12, neither the part of the flange extending outside the item nor the part of the flange extending inside the item. Thus, the item to be cast in the moulding tool will obtain a shape as illustrated in FIG. 1.

FIG. 13 to FIG. 24 show a different sequence of manufacturing a mould by the method according to the invention. The mould is intended for casting items of metal in a mould of plaster of Paris. The sequence shown in FIG. 13 to FIG. 18 corresponds to the sequence shown in FIG. 1 to FIG. 6. Therefore, FIG. 13 to FIG. 18 will not be described in further detail. FIG. 19 shows that treatment of the separation zone takes place already after the first mould part and the second mould part of silicone have been produced.

FIG. 19 shows a first mould part 39 and a second mould part 40 of a negative mould produced from silicone. FIG. 20 shows the casting of a first mould part 41 and a second mould part 42 of a first positive mould produced from silicone. FIG. 21 shows the first mould part 41 and the second mould part 42 of the first positive mould. FIG. 22 shows the casting of a first mould part 43 and a second mould part 44 of a second negative mould produced from plaster of Paris. FIG. 23 shows the first mould part 43 and the second mould part 44 of the second negative mould. FIG. 24 shows the first mould part 43 and the second mould part 44 of plaster of Paris joined into a complete mould having an inlet 38.

FIG. 25 to FIG. 36 show a third sequence of producing a mould by the method according to the invention. The mould is intended for casting items of metal, preferably cast iron, in a mould of sand. The sequence shown in FIG. 25 to FIG. 30 corresponds to the sequence shown in FIG. 1 to FIG. 6. Therefore, FIG. 25 to FIG. 30 will not be described in further detail.

FIG. 31 shows a first mould part 39 and a second mould part 40 of a negative mould produced from silicone. FIG. 32 shows the casting of a first mould part 45 and a second mould part 46 of a first positive mould produced from rubber or silicone. FIG. 33 shows the first mould part 45 and the second mould part 46 of the first positive mould. FIG. 34 shows the casting of a first mould part 47 and a second mould part 48 of a second negative mould produced from sand. FIG. 35 shows the first mould part 47 and the second mould part 48 of the second negative mould. FIG. 36 shows the first mould part 47 and the second mould part 48 of sand joined into a complete mould having an inlet 38.

FIG. 37 to FIG. 50 show a fourth sequence of manufacturing a mould by the method according to the invention. The mould is intended for casting items of metal in a mould of sand. The sequence shown in FIG. 37 to FIG. 42 corresponds to the sequence shown in FIG. 1 to FIG. 6. Therefore, FIG. 37 to FIG. 42 will not be described in further detail.

FIG. 43 shows a first mould part 39 and second mould part 40 of a negative mould produced from silicone. FIG. 44 shows the casting of a first mould part 49 and second mould part 50 of a first positive mould produced from silicone. FIG. 45 shows the first mould part 49 and the second mould part 50 of the first positive mould. FIG. 46 shows the casting of a first mould part 51 and a second mould part 52 of a second negative mould produced from plaster of Paris. FIG. 47 shows the first mould part 51 and the second mould part 52 of the second negative mould. FIG. 48 shows the casting of a first mould part 53 and a second mould part 54 of a second positive mould produced from metal, preferably aluminium. FIG. 49 shows the casting of a first mould part 55 and a second mould part 56 of a third negative mould produced from sand. FIG. 50 shows the first mould part 55 and the second mould part 56 of sand joined into a complete mould having an inlet 38.

FIG. 51 to FIG. 60 show a fifth sequence of manufacturing a mould by the method according to the invention. The mould is intended for casting items of metal in a mould of plaster of Paris. The sequence shown in FIG. 51 to FIG. 56 corresponds to the sequence shown in FIG. 1 to FIG. 6. Therefore, FIG. 51 to FIG. 56 will not be described in further detail.

FIG. 57 shows the casting in a first mould part 27 and a second mould part 28 of a first negative mould produced from silicone, of a first mould part 57 and second mould part 58 of a second negative mould produced from plaster of Paris. Casting takes place with a model inserted into the first mould part 27 of silicone and subsequently the second mould part 28 of silicone. The model 21 may be the model produced as illustrated in FIG. 51 to FIG. 56. The model may also be an alternative model moulded in the silicone mould shown in FIG. 56. An alternative model is preferably produced from soft rubber. FIG. 58 shows the first mould part 57 and the second mould part 58 of the second negative mould. FIG. 59 shows the first mould part 57 and the second mould part 58 of the second negative mould of plaster of Paris after treatment of the separation zone 29 between the first mould part 57 and second mould part 58. FIG. 60 shows the first mould part 57 and the second mould part 58 after treatment joined into a complete mould having an inlet 38.

FIG. 61 to FIG. 68 show a sixth sequence of manufacturing a mould by the method according to the invention. The mould is intended for casting items of plastic in a mould of metal. The sequence shown in FIG. 61 to FIG. 63 corresponds to the sequence shown in FIG. 1 to FIG. 3. Therefore, FIG. 61 to FIG. 63 will not be described in further detail.

FIG. 64 shows the spraying of metal 59 onto the model 21. Spraying takes place from a first spray gun 60 and a second spray gun 61. The model 21 is suspended in a moulding box 62 extending along an outer periphery of the model 21. In stead of simultaneous spraying onto the first surface 13 and the second surface 14, spraying of metal may take place by an initial spraying onto the upper surface 13 and a subsequent spraying onto the second surface 14. Furthermore, the moulding box may be omitted. FIG. 65 shows the model 21 suspended in the moulding box 62 and having metal 59 sprayed onto the upper surface 13 and the lower surface 14. FIG. 66 shows a first shell 63 of sprayed metal 59 and a second shell 64 of sprayed metal 59. FIG. 67 shows the first shell 63 and the second shell 64 joined into a mould. FIG. 68 shows the first shell 63 and second shell 64 joined into a complete mould having an inlet 38. The first shell 63 and second shell 64 are provided with a back casting 65. The back casting 65 may be performed with different materials and is intended to increase the strength of the mould and to facilitate the suspension of the mould. In an alternative embodiment the back casting 65 is omitted.

Figure 13:
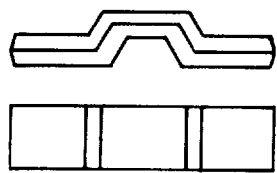
Figure 17:
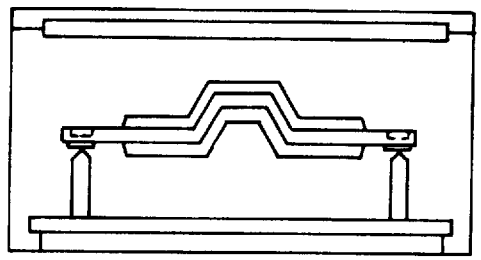
Figure 14:
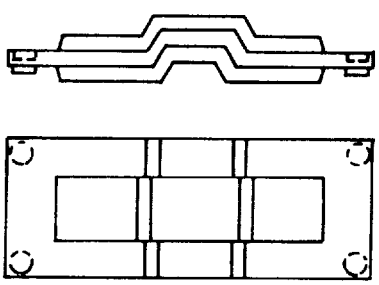
Figure 15:
Figure 18:
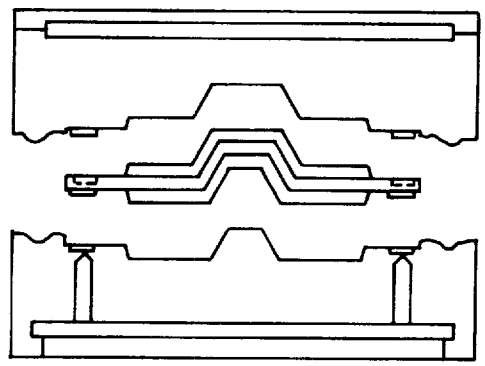
Figure 19:
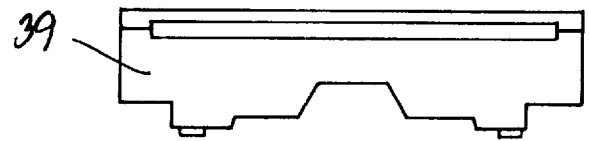
Figure 16:
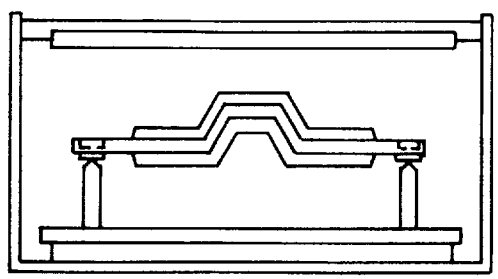
Figure 58:
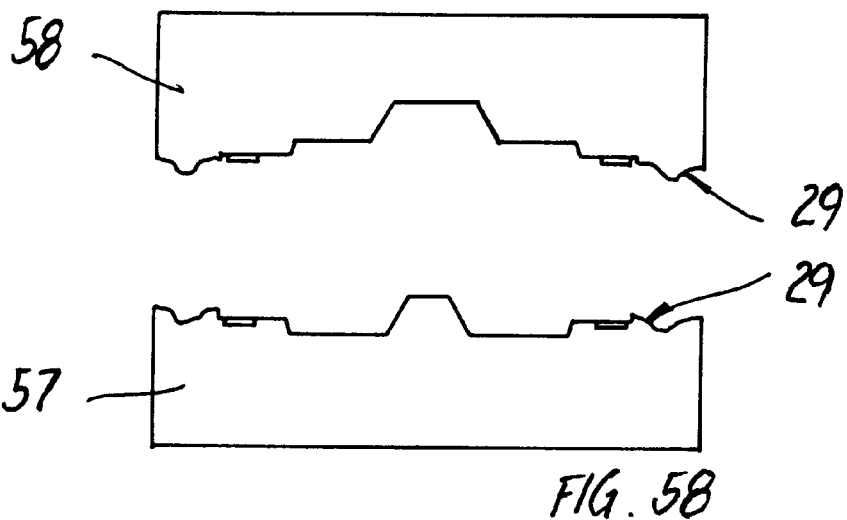
Figure 59:
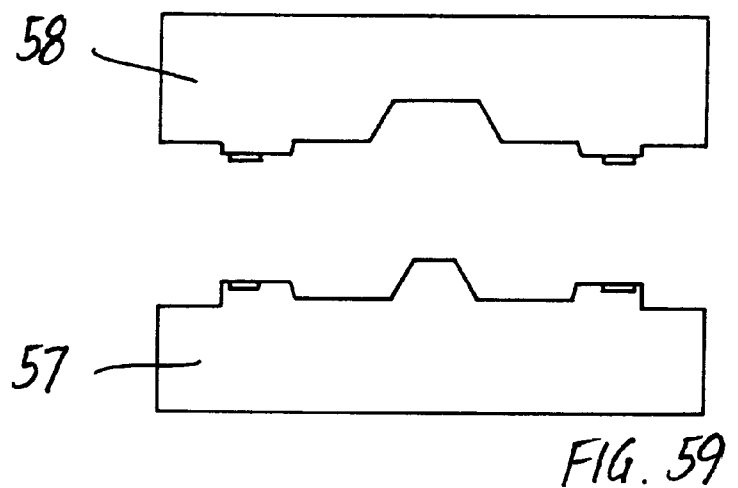
Figure 60:
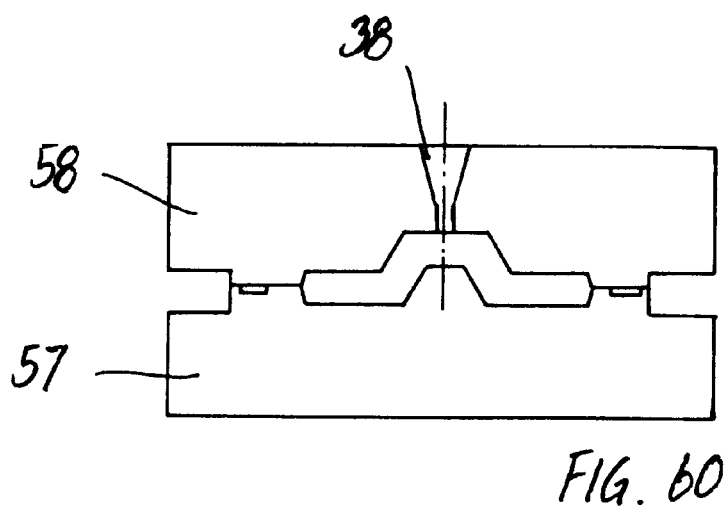
Figure 61:
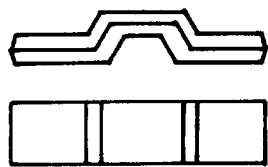
FIGS. 61–68 are outlines of a sixth sequence of manufacturing a mould according to the invention.
Figure 62:
Figure 63:
Figure 64:
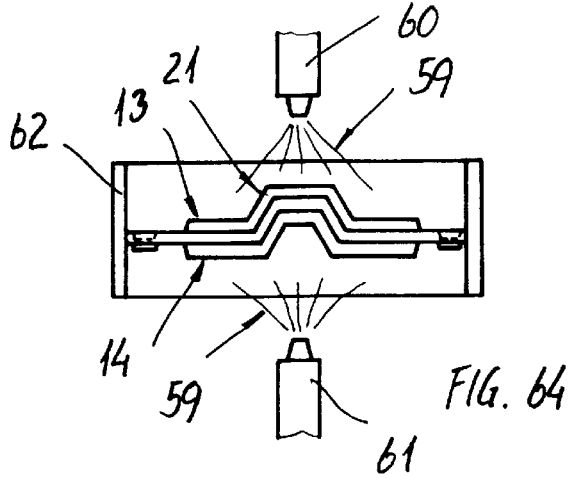
Figure 65:
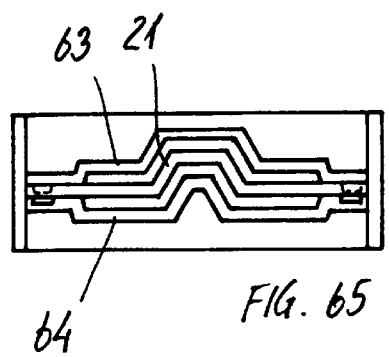
Figure 66:
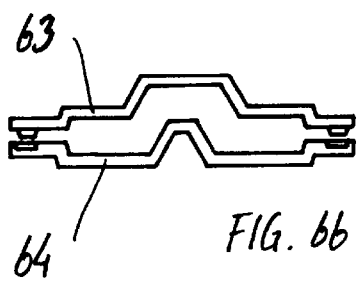
Figure 67:
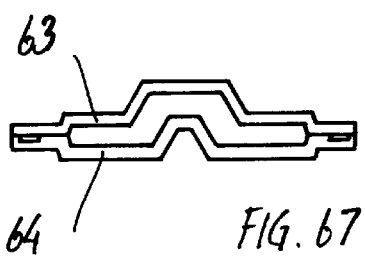
Figure 68:
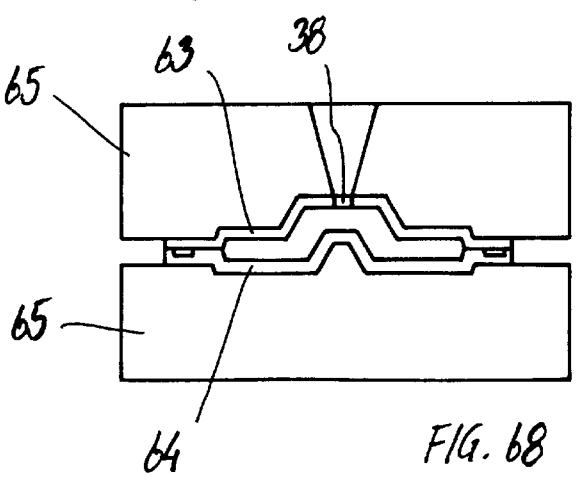

As mentioned, the invention may be used for several kinds of casting processes such as plastic casting, aluminium casting or the casting of steel such as DISAMATIC® casting. The materials referred to as possible materials for casting and the materials referred to as possible materials for moulds may be replaced by other materials. This is in consideration of the material from which a given item is produced and in consideration of the embodiments of the method according to the invention for the manufacture of a mould that are used. The invention has been illustrated in combination with the manufacture of moulding tools consisting of two mould parts. The method according to the invention may also be used for the manufacture of moulding tools having more than two mould parts. The method according to the invention may also be used in combination with cores, pushers or other aids for moulding.

What is claimed is:

1. A method of producing a model for use in the manufacture of a mould that consists of a multisection mould, said method comprising the steps of: forming a first positive model of an item to be moulded in a moulding tool; providing said model with a flange, which is provided in a joint surface being formed with an outer circumference outside of and along the outer periphery of the model; displacing parts of the model to form a predetermined distance between the parts; constructing, within a computer environment, a positive model with a built-in joint surface extending inside the model and out to the outer periphery of the model; separating, within said computer environment, the item into several parts along the joint surface; displacing the parts along a chosen direction, such that the flange is formed electronically in the computer environment, said flange being coherent and being extended in the distance between the parts along said joint surface, and such that a physical model in space of the item with the flange is formed in a copy modeling process.

2. A method of manufacturing a mould that consists of a multisection mould, using the method according to claim 1, wherein the flanged model is cast in a mass of material for the manufacture of a mould, a mould is formed around the model, the mould is cut along a separation zone extending from outer surfaces of the mould to an outer edge area of the flange, the mould is separated into at least a first mould part and a second mould part, and the separation zone is treated for removal of superfluous material corresponding to the dimension of the flange.

3. A method of manufacturing a mould that consists of a multisection mould, using the method according to claim 1, wherein the flanged model is cast in a mass of flexible material, wherein a first negative mould of the model is formed in a first intermediate step, a second positive model is formed in a second intermediate step by casting in the first negative mould, and a second negative mould of the model is formed in a third intermediate step by casting in the second positive model.

4. A method according to claim 3, wherein a cast of the first positive model of the item is suspended in a casting box, the flexible material is silicone cast in the box so that a first positive model is moulded into the silicone, the silicone is cut along a separation zone extending from the outer surfaces of the silicone to an outer edge area of the flange, and the silicone is separated in a first mould part and a second mould part.

5. A method according to claim 4, wherein mould stabilizer elements are embedded in the silicone, and that the mould stabilizer elements comprise plate elements and guiding elements.

6. A method according to claim 5, wherein the item is provided with reference points, that the reference points are provided with an upper side situated in an upper plane perpendicular to the unmoulding direction, and that the reference points contact the guiding elements.

7. A method according to claim 4, for manufacturing a mould for casting a plastic item, wherein, in the second intermediate steps, a first mould part and a second mould part of a second positive model in plaster of Paris are formed by plaster being moulded in the first silicone mould part and the second silicone mould part, in the third intermediate step a first mould part and a second mould part of a second negative mould of metal are formed by metal being moulded in the first mould part and the second mould part of plaster of Paris, and the first mould and the second mould part of metal are treated from outer surfaces to the joint surface for removal of a contribution originating from the flange for increasing a thickness of the joint surface.

8. A method according to claim 7, wherein the first mould part of plaster and the second mould part of plaster are provided with tubings having a porous outer wall, an overpressure of gas, is established in the tubings after the plaster has been separated into a first mould part and a second mould part, the gas is blown through the plaster in order to dry the plaster, and an underpressure of a gas, is established in the tubings when metal is cast in a moulding tool consisting of a first mould part and a second mould part of plaster.

9. A method according to claim 7, wherein mould stabilizer elements are embedded in the silicone, and that the mould stabilizer elements comprise plate elements and guiding elements.

10. A method according to claim 9, wherein the item is provided with reference points, that the reference points are provided with an upper side situated in an upper plane perpendicular to the unmoulding direction, and that the reference points contact the guiding elements.

11. A method according to claim 4, for manufacturing a mould for moulding an aluminum item, wherein the first mould part and the second mould part of silicone are treated from outer surfaces to the joint surface for removal of a contribution originating from the flange for increasing a thickness of the joint surface, in a second intermediate step a first mould part and a second mould part of the second positive model of silicone are formed by silicone being cast in the first mould part of silicone and in the second mould part of silicone, and in a third intermediate step a first mould part and a second mould part of a second negative mould of plaster are formed by plaster being cast in the first mould part and the second mould part of the second positive model of silicone.

12. A method according to claim 11, wherein the first mould part of plaster and the second mould part of plaster are provided with tubings having a porous outer wall, an overpressure of gas, is established in the tubings after the plaster has been separated into a first mould part and a second mould part, the gas is blown through the plaster in order to dry the plaster, and an underpressure of a gas, is established in the tubings when metal is cast in a moulding tool consisting of a first mould part and a second mould part of plaster.

13. A method according to claims 11, wherein mould stabilizer, elements are embedded in the silicone, and that the mould stabilizer elements comprise plate elements and guiding elements.

14. A method according to claim 13, wherein the item is provided with reference points, that the reference points are provided with an upper side situated in an upper plane perpendicular to the unmoulding direction, and that the reference points contact the guiding elements.

15. A method for manufacturing a mould consisting of a multisection mould, using the method according to claim 1, wherein in a first intermediate step a first mould part and a second mould part of a first negative mould are formed by metal being sprayed onto an upper surface and a lower surface of the model, and that a first shell and a second shell of metal are formed.

* * * * *